US011022004B2

(12) United States Patent
Duce et al.

(10) Patent No.: US 11,022,004 B2
(45) Date of Patent: Jun. 1, 2021

(54) ENGINE SHAFT INTEGRATED MOTOR

(71) Applicant: The Boeing Company, Chicago, IL (US)

(72) Inventors: Jeffrey Lynn Duce, Maple Valley, WA (US); Kent E. Karnofski, Lake Forest Park, WA (US); Stephen D. Oehler, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/475,935

(22) Filed: Mar. 31, 2017

(65) Prior Publication Data

US 2018/0283220 A1    Oct. 4, 2018

(51) Int. Cl.
| | | |
|---|---|---|
| *F01D 25/36* | (2006.01) | |
| *F02C 7/36* | (2006.01) | |
| *F01D 25/24* | (2006.01) | |
| *B64D 27/18* | (2006.01) | |
| *B64D 31/06* | (2006.01) | |

(Continued)

(52) U.S. Cl.
CPC ............ *F01D 25/36* (2013.01); *B64D 27/18* (2013.01); *B64D 31/06* (2013.01); *F01D 15/10* (2013.01); *F01D 25/24* (2013.01); *F02C 7/36* (2013.01); *H02K 7/1823* (2013.01); *B64D 2221/00* (2013.01); *F05D 2220/768* (2013.01); *F05D 2260/4031* (2013.01); *Y02T 50/60* (2013.01)

(58) Field of Classification Search
CPC ......... F01D 25/36; F01D 25/24; B64D 27/18; B64D 31/06; B64D 2221/00; F02C 7/36; H02K 7/1823; F05D 2220/768; F05D 2260/4031

USPC ......................................................... 290/52
See application file for complete search history.

(56) References Cited

U.S. PATENT DOCUMENTS

| | | |
|---|---|---|
| 3,180,614 A | 4/1965 | Ellenberger et al. |
| 4,249,083 A * | 2/1981 | Bitterly ..................... F01D 1/24 |
| | | 290/1 R |

(Continued)

FOREIGN PATENT DOCUMENTS

| | | |
|---|---|---|
| DE | 4437662 | 4/1996 |
| EP | 1507068 | 2/2005 |

(Continued)

OTHER PUBLICATIONS

Extended European Search Report dated Jul. 3, 2018 for European Patent Application No. 18165096.1.

(Continued)

*Primary Examiner* — Charles Reid, Jr.
(74) *Attorney, Agent, or Firm* — Gates & Cooper LLP (57) ABSTRACT

A method of integrating an electric motor or generator as part of an aircraft engine shaft. The motor is used to rotate the rotor so as to cool the rotor in a temperature gradient. The generator is used to provide power to the aircraft. In one or more examples, a power generation device includes a gas turbine engine including a rotor shaft and a first casing around the rotor shaft; a transmission connecting the rotor shaft to a gearbox, the transmission comprising a drive shaft and a second casing around the drive shaft; and a brushless DC motor integrated with the engine and including one or more permanent magnets and one or more coils.

18 Claims, 10 Drawing Sheets

(51) Int. Cl.
*H02K 7/18* (2006.01)
*F01D 15/10* (2006.01)

(56) References Cited

U.S. PATENT DOCUMENTS

| | | | | | |
|---|---|---|---|---|---|
| 5,030,877 | A | * | 7/1991 | Denk | H02K 3/47 |
| | | | | | 290/52 |
| 5,121,605 | A | * | 6/1992 | Oda | F01D 5/10 |
| | | | | | 290/52 |
| 6,344,700 | B1 | * | 2/2002 | Eisenhauer | F02N 11/04 |
| | | | | | 244/7 A |
| 6,467,725 | B1 | * | 10/2002 | Coles | F01D 15/10 |
| | | | | | 244/58 |
| 8,446,060 | B1 | * | 5/2013 | Lugg | H02K 21/14 |
| | | | | | 310/103 |
| 8,820,046 | B2 | | 9/2014 | Ross et al. | |
| 9,431,877 | B2 | * | 8/2016 | Zehnle | F01D 15/10 |
| 2004/0080165 | A1 | * | 4/2004 | Geis | F01D 15/08 |
| | | | | | 290/52 |
| 2007/0006445 | A1 | * | 1/2007 | Down | F16C 3/02 |
| | | | | | 29/596 |
| 2007/0194638 | A1 | * | 8/2007 | Birdi | H02K 1/32 |
| | | | | | 310/54 |
| 2007/0194639 | A1 | * | 8/2007 | Birdi | H02K 1/20 |
| | | | | | 310/54 |
| 2008/0136190 | A1 | * | 6/2008 | Lee | F01D 25/22 |
| | | | | | 290/52 |
| 2008/0157622 | A1 | * | 7/2008 | Shah | H02K 3/28 |
| | | | | | 310/184 |
| 2008/0174194 | A1 | * | 7/2008 | Qu | H02K 7/1823 |
| | | | | | 310/114 |
| 2008/0246362 | A1 | * | 10/2008 | Hirzel | H02K 21/12 |
| | | | | | 310/156.02 |
| 2009/0301053 | A1 | | 12/2009 | Geiger | |
| 2010/0327588 | A1 | | 12/2010 | Macchia | |
| 2010/0327589 | A1 | * | 12/2010 | Macchia | F01D 15/10 |
| | | | | | 290/52 |
| 2012/0286516 | A1 | * | 11/2012 | Chong | H02K 7/1823 |
| | | | | | 290/52 |
| 2013/0020888 | A1 | * | 1/2013 | Anthony | F01D 15/10 |
| | | | | | 310/52 |
| 2013/0091850 | A1 | | 4/2013 | Francisco | |
| 2014/0373553 | A1 | | 12/2014 | Zaccaria et al. | |
| 2016/0138415 | A1 | * | 5/2016 | Poisson | F01D 21/003 |
| | | | | | 415/10 |
| 2016/0348588 | A1 | | 12/2016 | Ross et al. | |
| 2017/0082029 | A1 | | 3/2017 | Zipperer | |
| 2017/0141648 | A1 | * | 5/2017 | Chong | H02K 16/02 |
| 2017/0234237 | A1 | * | 8/2017 | Pech | F02C 7/32 |
| | | | | | 60/778 |
| 2017/0240269 | A1 | * | 8/2017 | Cox | B64C 25/405 |
| 2017/0307050 | A1 | * | 10/2017 | Nelson | F16H 3/42 |

FOREIGN PATENT DOCUMENTS

| | | |
|---|---|---|
| EP | 2305986 | 4/2011 |
| EP | 2554799 | 2/2013 |
| EP | 2602458 | 6/2013 |
| EP | 3051074 | 8/2016 |
| EP | 3211184 | 8/2017 |
| WO | 2013072291 | 5/2013 |
| WO | 2016020618 | 2/2016 |

OTHER PUBLICATIONS

Barbuti, A., "Inboard, Electric Skateboard on 'Shark Tank': A Look Inside the Company", HEAVY, http://heavy.com/news/2016/12/inboard-electric-skateboard-shark-tank-products-episodes-new-season-8/, as downloaded Apr. 28, 2017, pp. 1-7.
Inboard Technology, https://inboardtechnology.com/blog/, as downloaded Apr. 28, 2017, pp. 1-2.
Extended European Search Report dated Jun. 4, 2018 for European Patent Application No. 18160131.1.
Extended European Search Report dated Oct. 10, 2018 for European Patent Application No. 18163383.5.
European Communication dated Feb. 6, 2020 for European Patent Application No. Application No. 18165096.1.
Canadian Examination Report dated Mar. 25, 2021 for Canadian Patent Application No. 2,995,217.

* cited by examiner

ENGINE SHAFT INTEGRATED MOTOR

BACKGROUND

1. Field

The present disclosure relates to a system for connecting a motor and/or generator to an aircraft gas turbine engine.

2. Description of the Related Art

Figure 1:
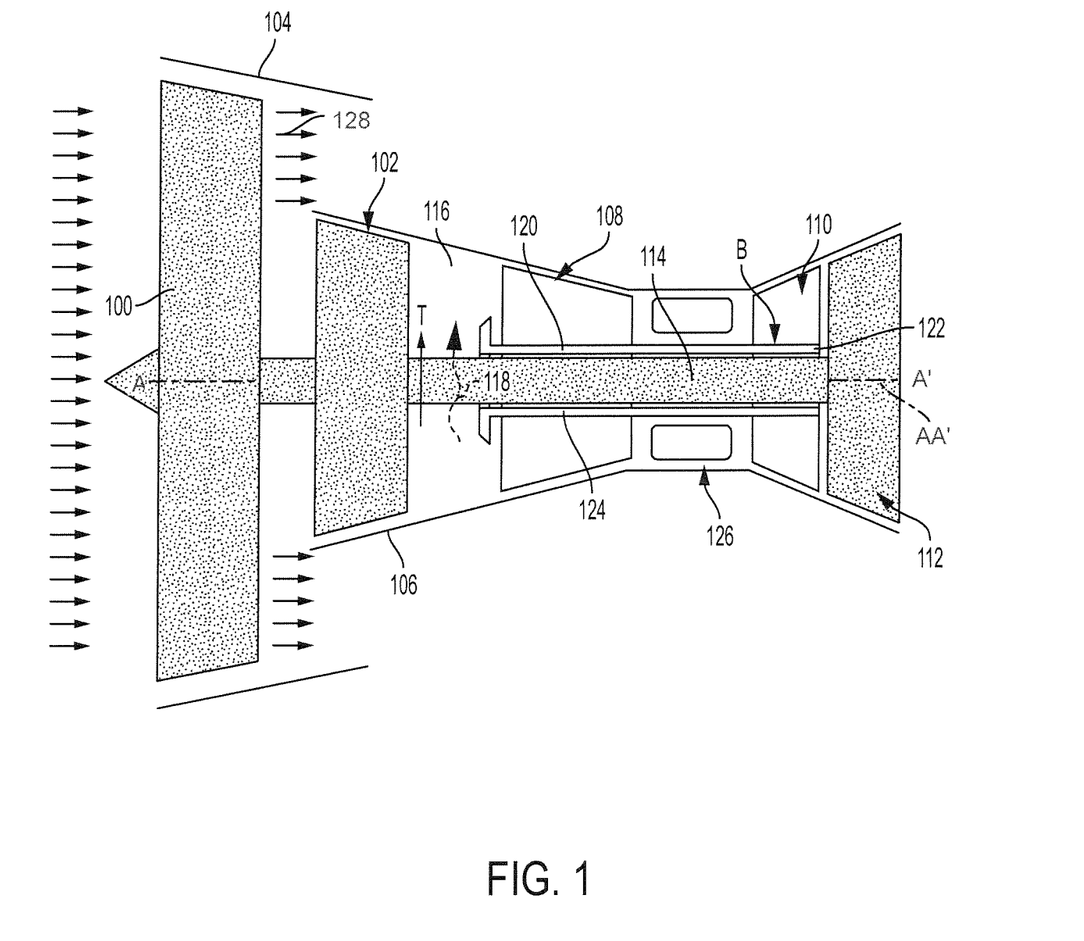
FIG. 1 is a cross-sectional schematic diagram of a gas turbine engine.

FIG. 1 illustrates an aircraft engine comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing, where the upper portion 120 of the rotor shaft 122 becomes longer than the lower portion 124). Upon engine restart (e.g., prior to fuel ignition in the combustor 126), even tiny fractions of rotor shaft bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, damage to the air pre-cooler used by the environmental control system, or damage to other accessories).

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require turning the rotor at low speeds. These delays not only inconvenience the passengers but also increase costs associated with increased waiting times and parking fees.

What is needed then, is a more efficient method for mitigating rotor shaft bowing that simplifies ground logistics. The present disclosure satisfies this need.

SUMMARY

The present disclosure describes a motor (e.g., a direct current motor), including a gas turbine engine including a rotor shaft and a first casing around the rotor shaft; a transmission connecting the rotor shaft to a gearbox, the transmission comprising a drive shaft and a second casing around the drive shaft; one or more permanent magnets attached to the rotor shaft and/or the drive shaft; one or more electromagnets attached to the first casing and/or the second casing; and a power supply connected to the electromagnets. The rotor shaft turns when (1) the electromagnets generate first magnetic fields in response to current supplied from the power supply and (2) the first magnetic fields interact with second magnetic fields generated by the permanent magnets.

In one embodiment, a nacelle houses the gas turbine engine. When the nacelle traps hot air, a temperature gradient is created perpendicular to the longitudinal axis of the rotor shaft. However, when the motor is operated, interaction of the first and second magnetic fields turns the rotor shaft so as to reduce or prevent thermal bowing of the rotor shaft in the temperature gradient when the gas turbine engine is cooling down after shutdown of the gas turbine engine.

The present disclosure further describes a power generation device, including a gas turbine engine including a rotor shaft and a first casing around the rotor shaft; a transmission connecting the rotor shaft to a gearbox, the transmission comprising a drive shaft and a second casing around the drive shaft; one or more permanent magnets attached to the rotor shaft and/or the drive shaft; one or more coils attached to the first casing and/or the second casing; and an energy storage device (e.g., a battery) connected to the coils. The energy storage device stores electrical energy generated by the coils when (1) the engine is running so as to rotate the permanent magnets on the shaft and (2) magnetic fields generated by the permanent magnets interact with the coils. The electrical energy is used to reduce transient and peak electrical power demands on the engine.

The present disclosure further describes a power generation device, comprising a gas turbine engine including a rotor shaft and a first casing around the rotor shaft; a transmission connecting the rotor shaft to a gearbox, the transmission comprising a drive shaft and a second casing around the drive shaft; one or more permanent magnets attached to the rotor shaft and/or the drive shaft; one or more coils attached to the first casing and/or the second casing;

and an aircraft electrical system connected to the coils. The aircraft electrical system receives electrical power generated by the coils when (1) the engine is running so as to rotate the permanent magnets on the shaft and (2) magnetic fields generated by the permanent magnets interact with the coils. The electrical power is used to either power an airplane system or an engine system.

In one embodiment, an aircraft comprises a computer connected to the engine. The current generated in the coils powers the electrical system during times of peak electrical loading of the electrical system. In this case, fuel consumption in the gas turbine engine can be reduced (as compared to when the gas turbine engine is used to power the electrical system without the current from the power generation device).

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Motors and generators, such as brushless direct current (DC) motors and generators, are fabricated by attaching permanent magnets on a rotor and using a series of electromagnets or coils on a fixed structure (stator) surrounding the rotor.

The present disclosure describes integrating the motor and/or generator in an airplane engine, wherein the airplane engine's shaft comprises the rotor and an engine casing or fixed mounting in the engine comprises the stator.

Figure 2A:
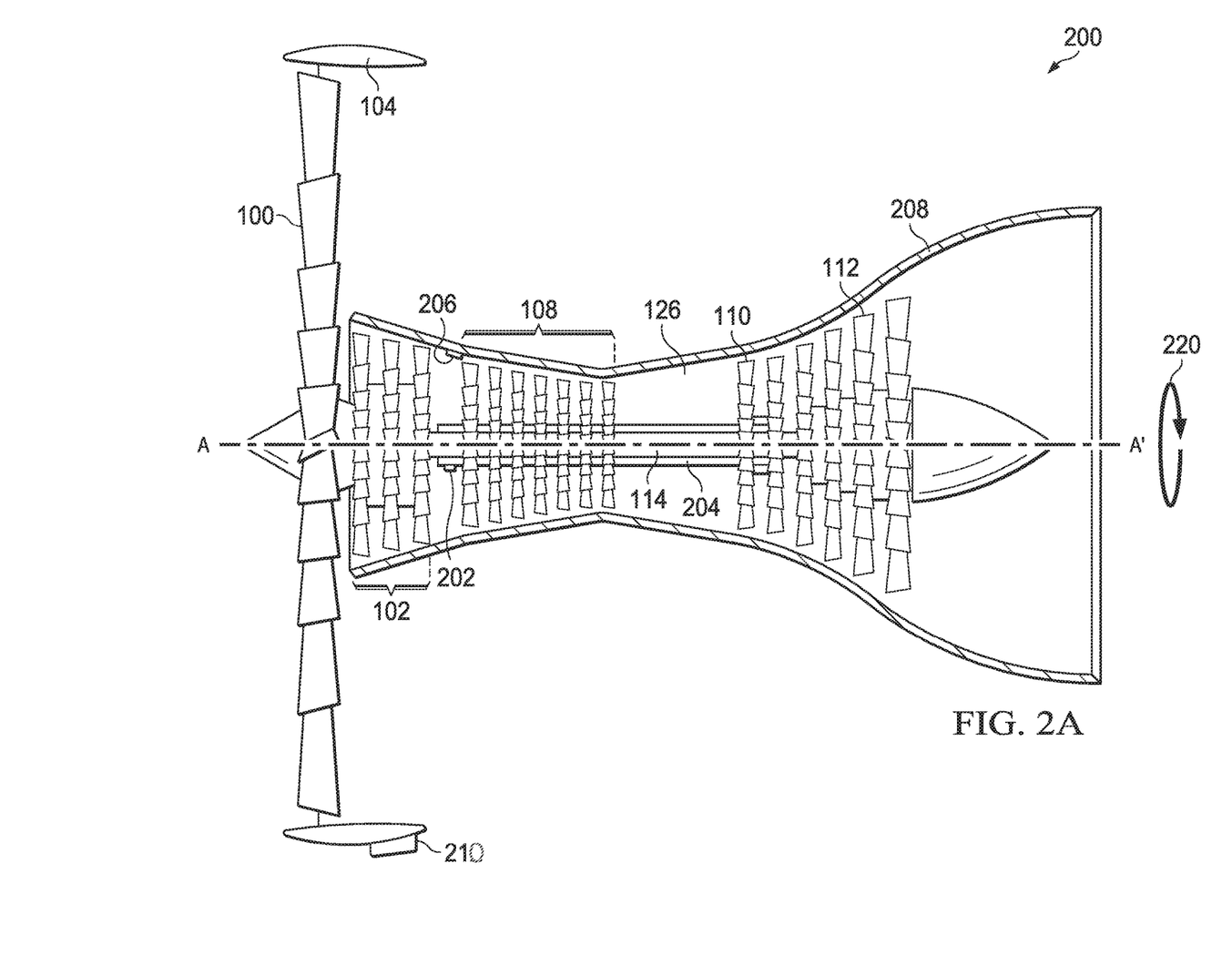
FIG. 2A is a cross-sectional schematic of a gas turbine engine according to one or more embodiments, showing the rotor shaft and the gearbox mounted to the fan case.
Figure 2B:
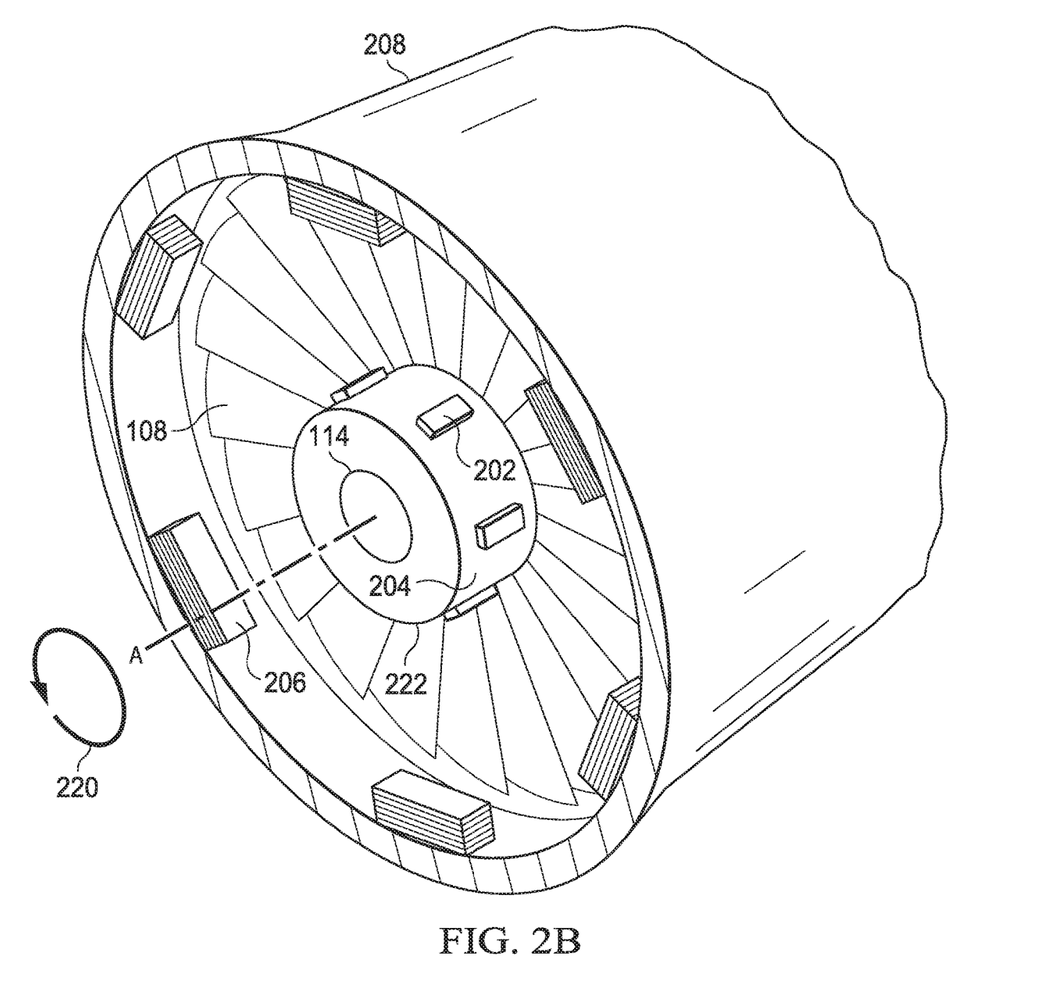
FIG. 2B is a close up view of the engine in FIG. 2A, illustrating an embodiment of a motor or generator and positioning of the magnets and coils in the motor.

FIG. 2A and FIG. 2B illustrate a gas turbine engine 200 including permanent magnets 202 attached to the rotor shaft 204; and a series of coils 206 (or electromagnets comprising coils 206) attached on a casing 208 surrounding or around the shaft 204. FIG. 2A further illustrates a gearbox 210 attached to the casing 104.

Figure 2C:
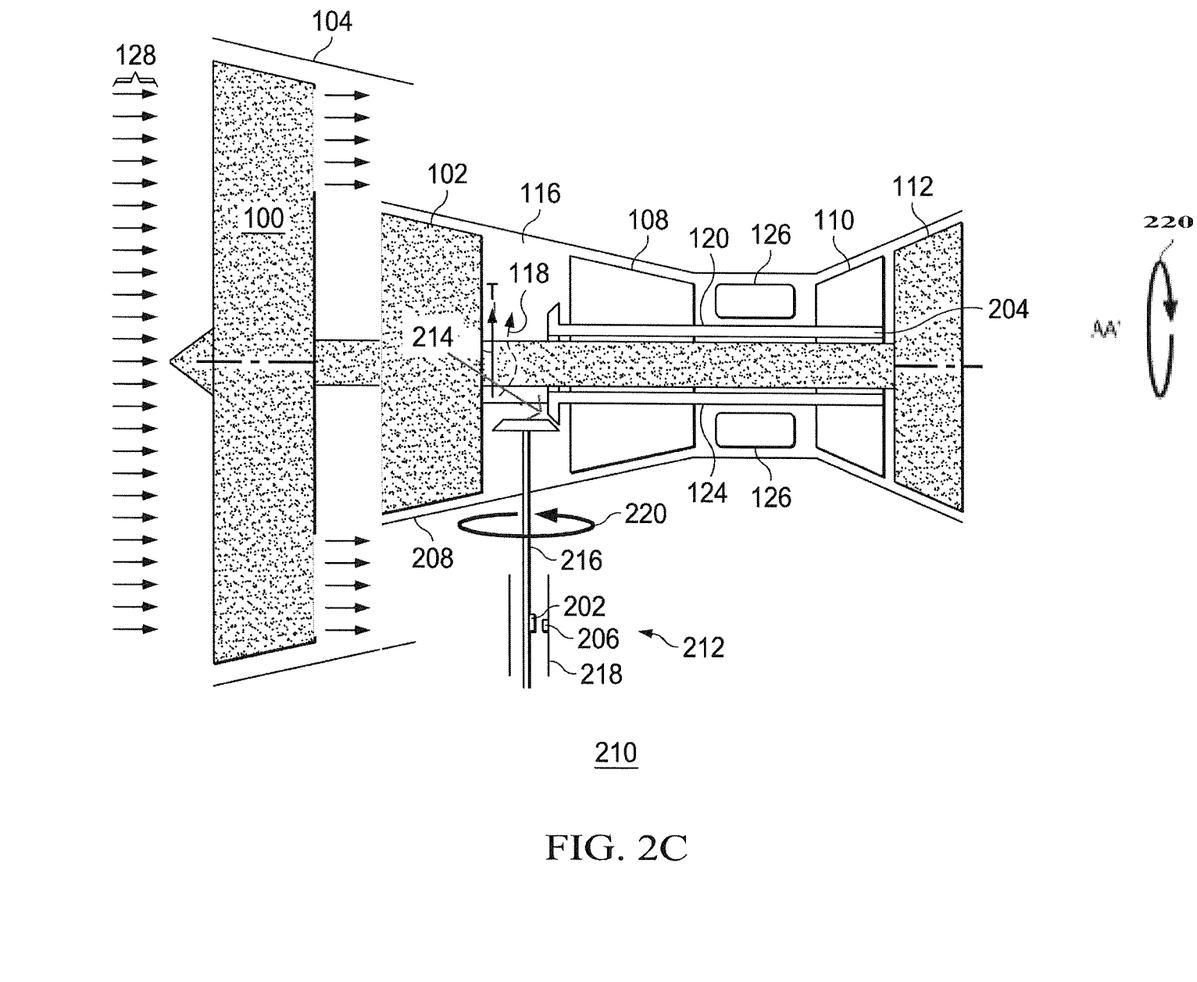
FIG. 2C illustrates an embodiment wherein the magnets and coils are positioned in a transmission connected to the rotor shaft.

FIG. 2C illustrates a gas turbine engine 200 including a rotor shaft 204 and a first casing 208 around the rotor shaft 204; a transmission 212 connecting the rotor shaft 204 to a gearbox 210, the transmission 212 comprising a bevel gears 214 and a drive shaft 216; a second casing 218 around the drive shaft 216; one or more permanent magnets 202 attached to the drive shaft 216; and one or more coils 206 (or electromagnets comprising coils 206) attached to the second casing 218.

In a motor embodiment, the permanent magnets 202 are repelled and/or attracted by the series of electromagnets, thereby causing the shaft 204, 216 to rotate 220. In one embodiment, the gearbox 210 does not include an engine turning motor because the motor 300 comprising permanent magnets 202 and electromagnets 302 is used to turn the rotor shaft 204.

In a generator embodiment, the rotor shaft 204 and the permanent magnets 202 rotate 220 (e.g., when the engine is operated in combustion mode with an air 128 intake) and the permanent magnets 202 induce current in the coils 206 when magnetic fields generated by the magnets 202 move through or interact with the coils 206.

First Example: Integrated Motor Operation

Figure 3A:
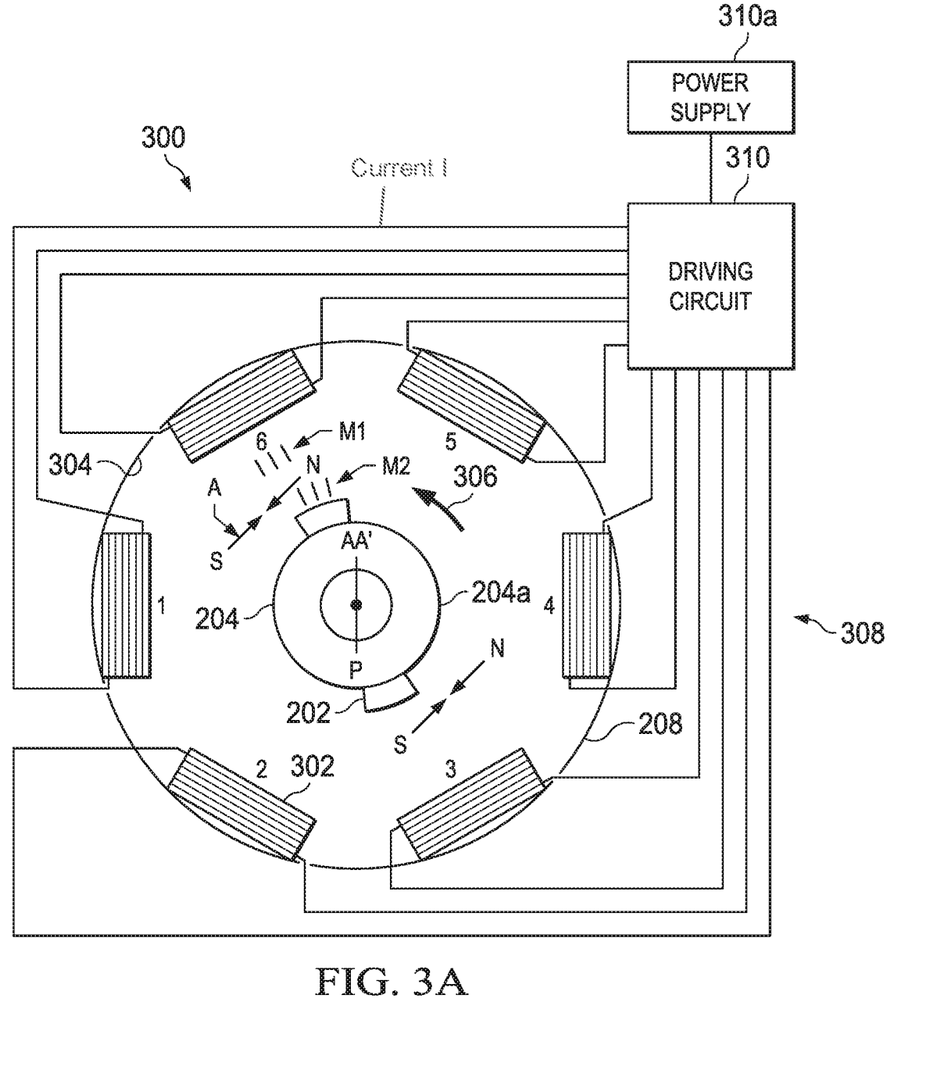
FIG. 3A illustrates a cross-section of the shaft in a plane perpendicular to the longitudinal axis AA' (i.e., as viewed along the longitudinal axis AA'), showing an embodiment of a motor, including positioning of the magnets and the electromagnets in the motor and connection of the driving circuit so as to energize the electromagnets.

FIG. 3A illustrates an integrated motor 300 comprising a plurality of electromagnets 302 comprising coils 206 (numbered 1-6) attached to the inner surface 304 of the casing 208. The electromagnets 302 and the permanent magnets 202 are positioned so that the shaft 204 rotates 306 about axis AA' when first magnetic fields M1 generated by the electromagnets 302 interact with (or have a force interaction with) second magnetic fields M2 generated by the permanent magnets 202.

In one or more embodiments, the permanent magnets 202 and the coils 206 are disposed symmetrically about a center point P on the longitudinal axis AA'.

Electrical wires 308 connect a driving circuit 310 (comprising or connected to a power supply 310a) to the electromagnets 302. The power supply 310a and circuit 310 supply current to the electromagnets 302 so as to generate the first magnetic fields M1. The current comprises a pulse sequence or waveform so that the first magnetic fields M1 are switched on and off to repel and/or attract A the permanent magnets 202 with synchronized timing that causes the rotor shaft 204 to turn 306.

Figure 3B:
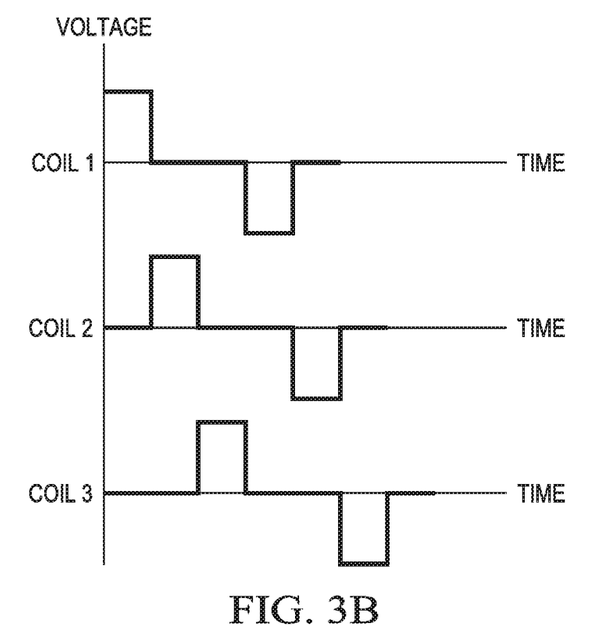
FIG. 3B is a diagram illustrating an exemplary timing sequence for applying voltage pulses that energize the electromagnets in the motor.

FIG. 3B illustrates a timing sequence for energizing the coils 206, wherein coil 1 is first energized using a voltage so that coil 1 has a magnetic field M1 with South (S) polarity that attracts the magnet 202 having North (N) polarity. At later times, coils 2 and 3 are energized so as to attract the magnet having N polarity as the magnet nears coils 2 and 3, respectively. In this example, diametrically opposite coils are electrically connected (coil 1 is connected to coil 4, coil 2 is connected to coil 5, and coil 3 is connected to coil 6) so that the magnetic fields in the opposite coils have opposite polarity (i.e., coil 1 has N polarity when coil 4 has S polarity).

Figure 3C:
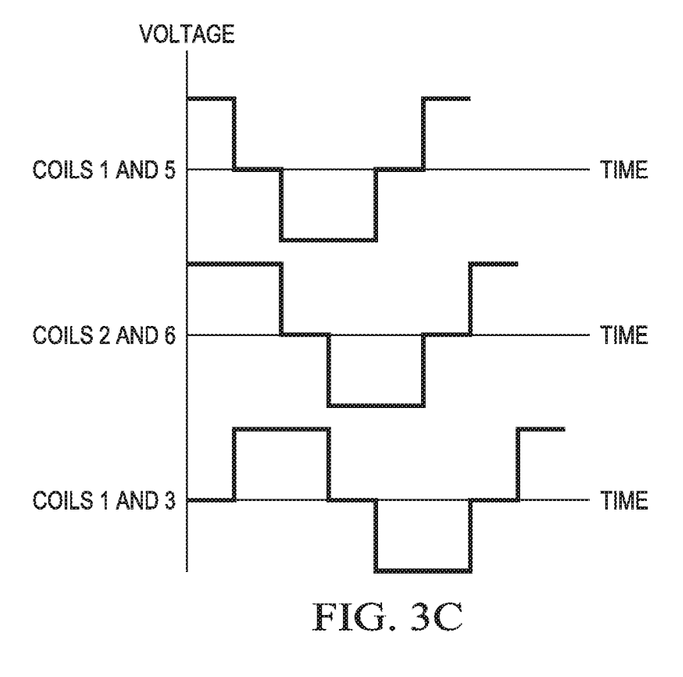
FIG. 3C is a diagram illustrating another exemplary timing sequence for applying voltage pulses that energize the coils in the motor.

FIG. 3C illustrates another timing sequence for energizing the coils 206, wherein coils 1 and 5 are connected and first simultaneously energized using voltages so that coil 1 has a magnetic field with S polarity that attracts the magnet 202 having N polarity and coil 5 has a magnetic field with polarity N to repel the magnet 202 having N polarity. Coils 2 and 6 are also simultaneously energized but out of phase with coils 1 and 5, so as to attract and repel the magnet having N polarity, respectively. Coils 3 and 1 are then subsequently energized at the same time so as to attract and repel the magnet having N polarity.

Second Example: Integrated Generator Operation

Figure 4A:
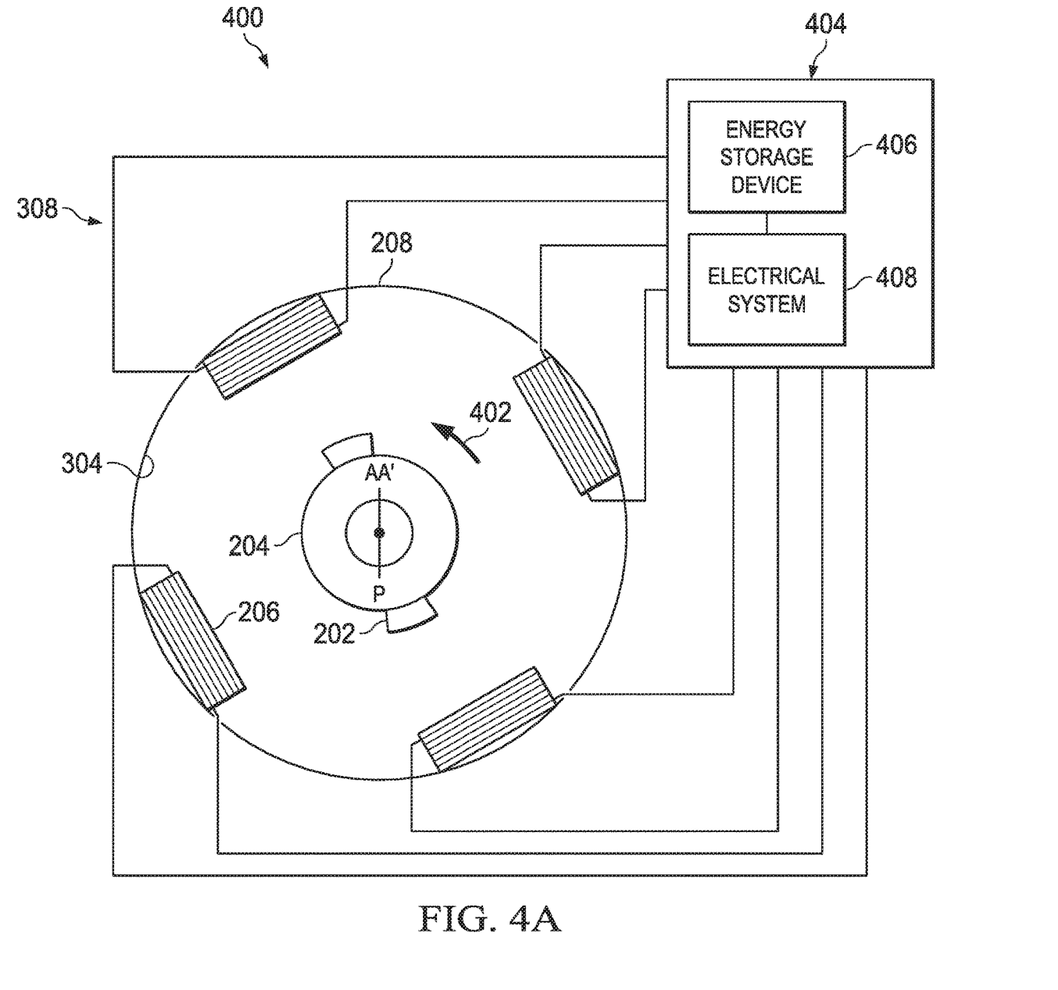
FIG. 4A illustrates a cross-section of the shaft in a plane perpendicular to the longitudinal axis AA' (i.e., as viewed along the longitudinal axis AA'), illustrating an embodiment of a generator, including positioning of the magnets and the coils in the generator and connection of a circuit to the generator.

FIG. 4A illustrates an integrated generator 400 comprising the coils 206 and the permanent magnets 202 positioned so that a current is generated in the coils 206 when the shaft 204 is rotating 402 (as a result of the engine 200 running in combustion mode and burning fuel when air 128 is inputted into the engine). The moving magnetic fields M2 generated by the permanent magnets 202 interact with, or pass through, the coils 206 and generate current according to Faraday's law.

Electrical wires 308 connect the coils 206 to a circuit 404 that comprises, or is connected to, an energy storage device 406 (e.g., battery) and/or an electrical system 408 on the aircraft, so that the current generated in the coils 206 charges the energy storage device 406 and/or supplies power to the electrical system 408.

The aircraft's electrical system 408 (e.g., powering air conditioning, cabin pressurization, and plumbing) adds various electrical loads during operation of the aircraft. Typically, some of the engine's rotational energy is converted into electrical energy in order to handle these additional loads. In this case, the engine then has to burn more fuel to maintain its original rotation speed. Consequently, the engine must be operated in such a way (i.e., with high enough speed) that it can withstand a sudden electrical load and maintain stability.

In one embodiment, the airplane extracts electrical power from the coils 206 in the integrated generator 400 to help power the electrical systems on the aircraft at various times, e.g., during peak electrical demands. This alleviates the burden on the engine, enabling less fuel burn and lower engine speeds for most of the flight while still accommodating sudden electrical loads applied to the electrical system.

Figure 4B:
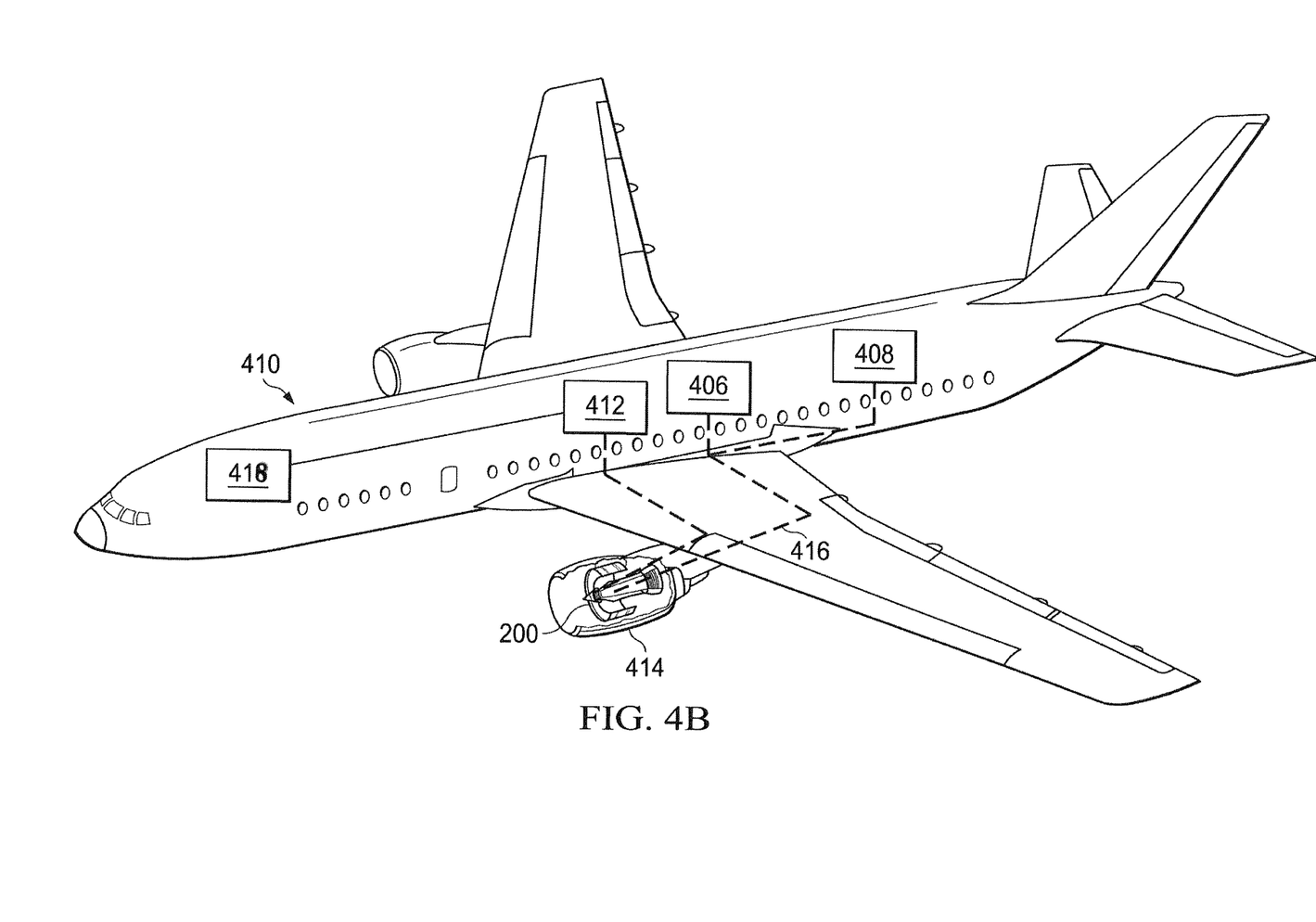
FIG. 4B is a diagram of an aircraft embodiment illustrating the coils connected to an energy storage device and electrical system.

FIG. 4B illustrates an airplane 410 comprising a computer 412, 602 comprising an engine control system connected to the engine 200 housed in a nacelle 414; and the electrical system 408 and energy storage device 406 connected to the coils 206 via wiring 416. The current from the coils 206 is used to power the electrical system, e.g., during times of peak electrical loading of the electrical system. The computer 412 or 418 reduces fuel consumption in the gas turbine engine 200 as compared to when the gas turbine engine is used to power the electrical system without the integrated generator 400. In another example, the integrated generator 400 is used as a load source or sink by the engine's control system so as to aid engine operability and engine acceleration rates, e.g., during abnormal flight conditions.

Peak electrical demands also impact engine sizing conditions. Conventionally, larger engines are used to mitigate for worst case energy scenarios. Use of the integrated generator system 400 to power the electrical system 408 enables implementation of smaller, lighter engines that burn less fuel.

Third Example: Rotor Shaft Bow Mitigation

Air 128 inputted into the nacelle 414 or fan casing 104 is trapped in the nacelle 414 and is heated by the engine 200 so as to form trapped hot air 116. The trapped hot air 116 creates a temperature gradient T perpendicular to a longitudinal axis AA' of the rotor shaft 204. In one embodiment, current I is provided to the electromagnets 302 so as to drive the shaft 204 when the gas turbine engine 200 is cooling down (e.g., after engine shut down) in the temperature gradient T, thereby reducing or preventing thermal bowing of the rotor shaft 204 in the temperature gradient T.

In one or more embodiments, the integrated motor 300 rotates 306 the rotor shaft 204 at one or more speeds, using one or more torques, and/or for one or more durations, so as to reduce or prevent the thermal bowing of the rotor shaft 204 in the temperature differential. Examples of rotation speeds include, but are not limited to, low speeds such as between 0.5-2.0 rpm (revolutions per minute).

Rotation 306 of the rotor shaft 204 includes, but is not limited to, pulsed rotation, continuous rotation, a combination of both pulsed rotation and continuous rotation, clocked rotation, and/or sporadic rotation.

In one embodiment, the integrated motor 300 turns the rotor shaft 204 slowly so that the rotor shaft 204 is slowly cooled and returned to thermal equilibrium. In another embodiment, the power to the motor 300 from the circuit 310 is pulsed or supplied periodically (i.e. once every 10 minutes, 30 minutes, hour, etc.) over a period of time (e.g., 8 hours) so that the rotor shaft 204 is rotated 220 periodically to promote an even temperature profile in the rotor shaft 204.

In another periodic pulsing scheme, power supplied to the motor 300 from the circuit 310 is applied every plurality of minutes (e.g. every 5-15 minutes) so that the rotor moves a partial turn or in increments. In one embodiment, partial turns are 'clocked,' e.g., for a one-half turn. In another example, a current pulse from the circuit 310 provides random rotor shaft 204 movement. In one embodiment, pulse modulation is achieved by programming the motor 300 to transfer increments of torque. In one embodiment, the motor 300 rotates 220 the shaft 204 by turning the shaft 204 in one or more increments comprising a partial revolution of the shaft.

In one example, the rotation speed and duration are such that the probability of a compressor rub is less than e-8 per flight-hour.

Example System Features

One or more embodiments of the integrated motor/generator 300, 400 are installed in an aircraft using components such that:
 the aircraft is capable of being dispatched for at least 10 days after a failure of the integrated motor/generator;
 failure of the integrated motor/generator does not require line maintenance to dispatch the aircraft;
 failure of the integrated motor/generator does not interfere with engine operation, and in particular, does not interfere with engine start;
 failure rate of the integrated motor/generator system is e-5 per flight hour or better;
 the integrated motor/generator is sufficiently reliable that a backup scheme is not required (e.g., the integrated motor/generator has a reliability of at least e-6 per flight hour or at least e-7 per flight hour);

the integrated motor/generator has a lock out feature, in case unforeseen issues arise and the system must be easily disabled;

energy demands for rotating the rotor and reducing the thermal bowing are reduced as compared to systems using an electric motor to rotate the rotor; and/or the installation and certification is easier as compared to systems using an electric motor to rotate the rotor (e.g., the integrated motor/generator does not include a new ignition source or fuel source adding to engine fire protection designs).

Process Steps

Figure 5:
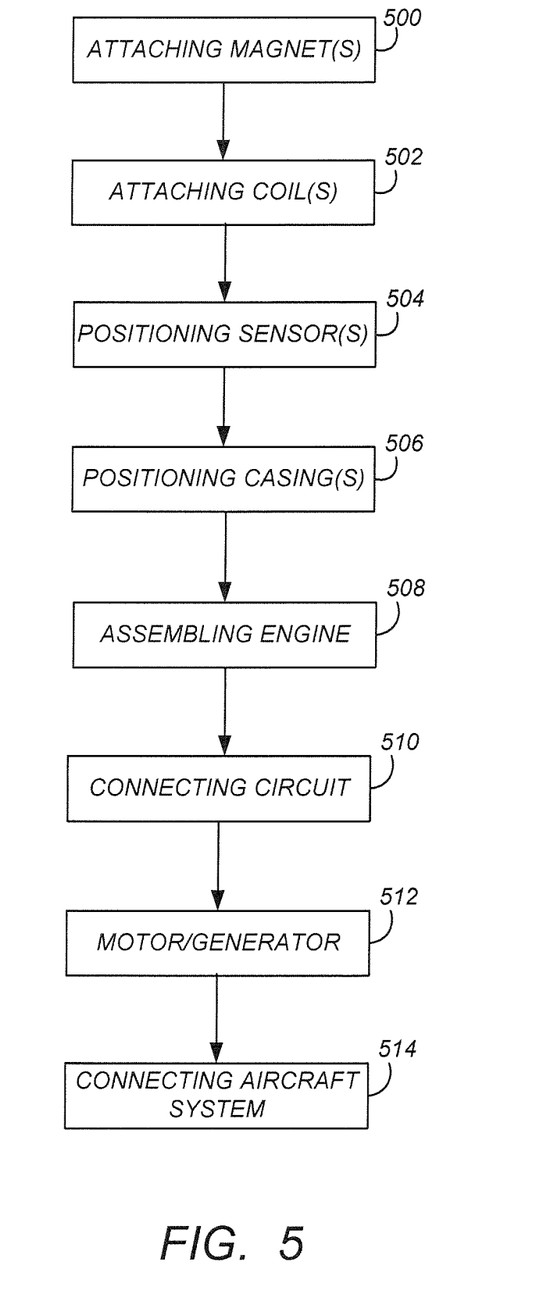
FIG. 5 is a flowchart illustrating an exemplary method of fabricating an integrated motor or generator.

FIG. 5 illustrates a method of fabricating a motor or generator, according to one or more embodiments. The method comprises one or more of the following steps.

Block 500 represents attaching one or more magnets to an outer surface 204a of a shaft 204, 216, e.g., as illustrated in FIG. 2B, FIG. 2C, FIG. 3A, and FIG. 4.

Examples of methods for attaching the magnets 202 include, but not limited to, printing the magnets on the shaft 204, 216 (using, for example, ink jet printing, functional ink, or magnetic ink), painting the magnets 202 on the shaft 204, 216, mechanically attaching the magnets 202 to the shaft 204, 216 (using, for example, adhesive or fasteners), or welding the magnets 202 onto the shaft (reference used as bevel gear), 216 (using, for example, dry welding). Examples of magnets 202 include, but are not limited to, permanent magnets such as rare-earth magnets (e.g., Neodymium magnets).

In one or more embodiments, the magnets 202 are disposed concentrically about a point P on the longitudinal axis In one example, the magnets 202 are disposed in pairs on the shaft 204, 216, wherein the magnets 202 in each pair are placed on opposite sides of the shaft 204, 216 or diametrically opposite one another. In one embodiment, the magnets 202 are placed symmetrically about the shaft 204, 216. In yet another embodiment, the magnets 202 are disposed in a ring around a center point P of the shaft 204, 216. In one or more embodiments, the magnets 202 comprise materials selected after a materials analysis determining the materials' ability to withstand the high temperature environment in the engine 200.

Block 502 represents attaching coils 206, or electromagnets 302 each comprising at least one coil 206, to an inner surface 304 of a casing 208 or sheath.

In one or more embodiments, the coils 206 comprise metal wires coated with an insulator. Examples of metal used for the wires include, but are not limited to, aluminum or copper. Examples of the insulator include, but are not limited to, high temperature polymers or ceramics. In one or more embodiments, the coil 206 comprises twisted shielded pairs of wires.

In one or more embodiments, the coils 206 are disposed in pairs on the casing 208, 218, wherein the coils 206 in each pair are placed on opposite sides of the casing 208, 218 or diametrically opposite one another. In another embodiment, the coils 206 are placed symmetrically about the shaft 204, 216. In yet another embodiment, the coils 206 are disposed in a ring around a center point P of the shaft 204, 216 or are wrapped around the rotor shaft 204, 216. In one or more embodiments, the coils 206 are fabricated from materials selected after a materials and/or metallurgy analysis determining the materials' ability to withstand the high temperature environment in the engine 200.

The coils 206 are attached using a variety of methods including, but not limited to, using adhesive.

In one or more embodiments, the magnets 202 are attached to the shaft 204, 216 in a relatively cold area of the shaft 204, 216, so as to reduce risk of damage to the coils and the magnets.

Block 504 represents optionally positioning sensors, e.g., on the casing 208, 218 so as to measure a location of the magnets 202 and/or coils 206 as they rotate 306. The location information is used to optimize timing of the current/voltage waveforms applied to the coils 206 by the circuit 310 so as to optimize rotation of the shaft.

Block 506 represents positioning the casing 208, 218 so that the inner surface 304 faces the outer surface 222 of the shaft 204, 216. In one or more embodiments, the casing 208, 218 is disposed concentrically about the shaft 204, 216.

Block 508 represents assembling the remainder of the gas turbine engine 200, including positioning the nacelle 414.

Block 510 represents connecting a circuit 310, 404. The electromagnets generate first magnetic fields M1 when current is supplied to the electromagnets 302 from the circuit 310 (when the apparatus is operating as a motor 300) or the circuit 404 receives current I induced in the coils 206 when the apparatus is operating as a generator 400.

Block 512, represents the end result, an apparatus comprising a motor 300 and/or generator/power generation device 400.

The motor 300 comprises a gas turbine engine 200 including a rotor shaft 204, 216 and a first casing 208 around the rotor shaft 204, 216; a transmission 212 connecting the rotor shaft 204 to a gearbox 210, the transmission 212 comprising a drive shaft 216 and a second casing 218 around the drive shaft 216; one or more permanent magnets 202 attached to the rotor shaft 204 and/or the drive shaft 216; one or more electromagnets 302 attached to the first casing 208 and/or the second casing 218; and a power supply 310a connected to the electromagnets 302. The rotor shaft 204 turns 220 when the electromagnets 302 generate first magnetic fields M1 in response to current I supplied from the power supply 310a and the magnets 202 and electromagnets 302 are positioned such that the first magnetic fields M1 interact with second magnetic fields M2 generated by the permanent magnets 202.

In one or more embodiments, the apparatus comprises a brushless DC motor 300 integrated with, or in situ on, the engine 200, wherein the brushless DC motor 300 comprises the permanent magnets 202 and the electromagnets 302.

In one embodiment, the rotating 306 comprises turning the shaft 204 by one or more partial turns (each partial turn less than one revolution) about axis AA'. In another embodiment, the rotating 220 comprises turning the shaft by more than one revolution about axis AA'.

The power generation device 400 includes a gas turbine engine 200 including a rotor shaft 204 and a first casing 208 around the rotor shaft 204; a transmission 212 connecting the rotor shaft 204 to a gearbox 210, the transmission 212 comprising a drive shaft 216 and a second casing 218 around the drive shaft 204; one or more permanent magnets 202 attached to the rotor shaft 204 and/or the drive shaft 216; and one or more coils 206 attached to the first casing 208 and/or the second casing 218.

In one embodiment, an energy storage device 406 (e.g., a battery) is connected to the coils 206. The energy storage device 406 stores electrical energy E generated by the coils 206 when the engine 200 is running so as to rotate 220 the permanent magnets 202 on the shaft 204, 216 and magnetic fields M2 generated by the permanent magnets 202 interact with the coils 206.

In another embodiment, an aircraft electrical system 408 is connected to the coils 206. The aircraft electrical system 408 receives electrical power P generated by the coils 206 when the engine 200 is running so as to rotate 220 the permanent magnets 202 on the shaft 204, 216, and the coils 206 and the permanent magnets 202 are positioned such that current I is generated in the coils 206 when the shaft 216, 204 is rotating 220 and magnetic fields M2 generated by the permanent magnets 202 interact with the coils 206.

In one or more embodiments, the apparatus comprises a brushless DC generator 400 integrated with, or in situ on, the engine 200, wherein the brushless DC generator 400 comprises the permanent magnets 202 and the coils 206.

In one or more embodiments, the apparatus has dual use and the magnets 202, the coils 206, and the circuit 310, 404 are configured so that the apparatus can be operated either as the generator 400 or the motor 300. In one embodiment, a circuit is provided that includes circuits 310 and 404, wherein the circuit comprise a switch switching between generator and motor operation.

Examples of the rotor shaft 204 include a low-pressure or a high-pressure shaft in a 2-spool engine 200, or a low-pressure or intermediate-pressure shaft in a 3 spool engine.

Block 514 represents connecting the generator or motor to an aircraft system.

In one embodiment, the generator 400 is connected to an electrical system 408 and/or energy storage device 406, so that the current I generated by the generator charges the energy storage device 406 or provides current I to the electrical system 408. The electrical power P is used to either power the airplane system 408 or an engine 200 system, e.g., to reduce transient and peak electrical power demands on the engine 200. Typically, the engine is responsible for generating electrical power for its own engine systems using two different and conventional electrical generators on the engine. However, in one embodiment, the power generation device 400 could replace either of the conventional electrical generators on the engine 200.

In another embodiment, the motor 300 is connected to a controller wherein the controller controls the rotation of the rotor 108 using the motor. The nacelle 414 comprises trapped air 116 creating a temperature gradient perpendicular to a longitudinal axis AA' of the rotor shaft 204. Interaction of the first magnetic field M1 and second magnetic field M2 turns 306 the rotor shaft 204 so as to cool the rotor shaft 204 and/or reduce or prevent thermal bowing of the rotor shaft 204 in the temperature gradient T when the gas turbine engine 200 is cooling down after shutdown of the gas turbine engine 200. In one example, the motor 300 is activated to rotate 306, 220 the rotor shaft 204 prior to engine start (i.e., prior to motoring the engine 200, and wherein motoring refers to rotating the shaft after engine start but prior to fuel on).

Processing Environment

Figure 6:
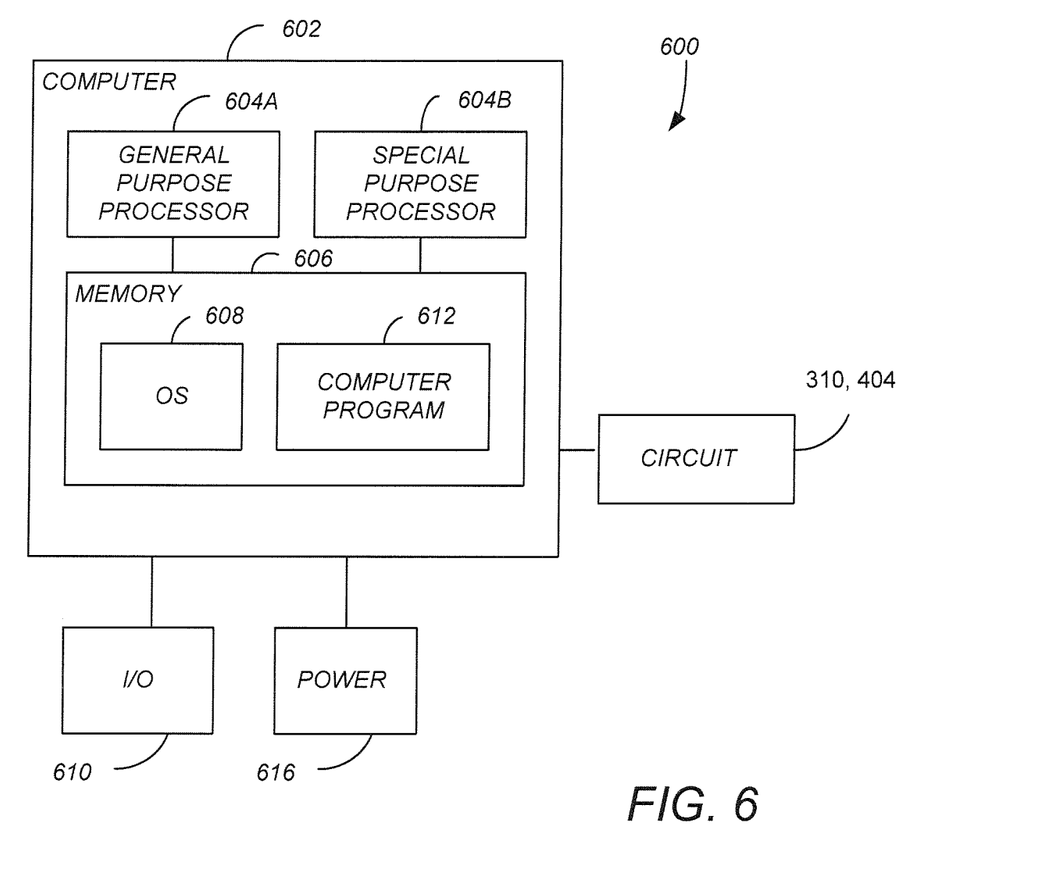
FIG. 6 illustrates an exemplary computer system used to implement processing elements.

FIG. 6 illustrates an exemplary system 600 that could be used to implement processing elements needed to control the integrated motor or generator 300, 400 described herein. The computer system is typically located on the aircraft e.g., but not limited to, in a box mounted on the engine fan case or inside the aircraft.

The computer 602 comprises a processor (general purpose processor 604A and special purpose processor 604B) and a memory, such as random access memory (RAM) 606. Generally, the computer 602 operates under control of an operating system 608 stored in the memory 606, and interfaces with the user/other computers to accept inputs and commands (e.g., analog or digital signals) and to present results through an input/output (I/O) module 610. The computer program application 612 accesses and manipulates data stored in the memory 606 of the computer 602. The operating system 608 and the computer program 612 are comprised of instructions which, when read and executed by the computer 602, cause the computer 602 to perform the operations herein described. In one embodiment, instructions implementing the operating system 608 and the computer program 610 are tangibly embodied in the memory 606, thereby making a computer program product or article of manufacture. As such, the terms "article of manufacture," "program storage device" and "computer program product" as used herein are intended to encompass a computer program accessible from any computer readable device or media.

In one embodiment, computer 602 comprises one or more field programmable gate arrays (FPGAs).

The computer system 600 is connected a circuit energizing the electromagnets or receiving current generated in the coils.

In one embodiment, an Electronic Engine Control (EEC) sending a digital request to the computer 602 through I/O 610 to reduce, increase, select timing of, and/or modify electrical current and/or voltages supplied to the integrated motor 300 in order to rotate the rotor 204, thus controlling HP compressor 108 speeds.

In another embodiment, the EEC unit sends a digital request to the controller 602 through I/O 610 to control current and/or voltage outputted from the integrated generator 400, so as to control flow the current or application of the voltage to the electrical system 408 or energy storage device 406. In yet another embodiment, the computer provides status to the EEC so that the controller and/or the EEC monitor system monitor performance and/or control the rotation of the rotor or supply of power to the electrical system.

In one embodiment, the computer 602 is connected to a flight management system via I/O 610. The flight management system comprises a computer 418 controlling fuel consumption of the engine 200 during flight, in response to power P provided to the electrical system 408 or the engine 200 by the integrated generator 400.

In one embodiment, the I/O 610 receives signal from an engine shut off switch after engine 200 shut down, thereby activating the integrated motor 300 so as to transfer energy/torque to the rotor shaft 204. In one example, the integrated motor 300 rotates the rotor soon/immediately after engine shut down so as to minimize aircraft departure delays caused by mitigating rotor shaft bow. In another embodiment, the computer 602 activates the means transferring energy from the flywheel to the rotor, so as to rotate the rotor prior to engine start (i.e., prior to motoring the engine).

In another embodiment, the duration of rotation 306 is optimized by having the computer 602 estimate the amount of bow (based on time since last engine shutdown) and calculate the required rotation duration to be implemented. Various instrumentation to monitor the bowing can include accelerometers already used for vibration monitoring or microwave-based gap measuring sensors.

FIG. 6 further illustrates a power source 616 for providing power to the system 600.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A power generation device, comprising:
 a gas turbine engine comprising:
  a rotor shaft;
  a high pressure compressor driven by the rotor shaft, the high pressure compressor comprising rotor blades attached to the rotor shaft; and
  a casing around the rotor shaft;
 one or more permanent magnets attached to the rotor shaft;
 one or more coils attached to the casing;
 a power supply;
 an aircraft electrical system;
 a switch connecting the power supply to the coils when the power generation device is operating as a motor and connecting the aircraft electrical system to the coils when the power generation device is operating as a generator; and
 the aircraft electrical system connected to the coils, wherein:
 the aircraft electrical system receives electrical power when:
  the gas turbine engine is running in a combustion mode so as to turn the rotor shaft and the permanent magnets on the rotor shaft, and
  one or more first magnetic fields generated by the one or more permanent magnets interact with the one or more coils; or
 the rotor shaft turns:
  the one or more coils generate one or more second magnetic fields in response to current supplied from the power supply and the one or more first magnetic fields interact with the one or more second magnetic fields; and
  so as to reduce or prevent thermal bowing of the rotor shaft in a temperature gradient when the gas turbine engine is cooling down after shutdown of the gas turbine engine.

2. The power generation device of claim 1, wherein the electrical power is used to either power an airplane system or an engine system.

3. The power generation device of claim 1, further comprising a transmission connecting the rotor shaft to a gearbox and wherein the gearbox does not include an engine turning motor.

4. The power generation device of claim 1, wherein the permanent magnets are on the rotor shaft and adjacent the rotor blades.

5. The power generation device of claim 1, further comprising:
 one or more electromagnets comprising the coils; and
 a nacelle housing the gas turbine engine, wherein the rotor shaft has a longitudinal axis, and
 the nacelle comprises trapped air creating the temperature gradient perpendicular to the longitudinal axis.

6. The device of claim 1, further comprising a space between the one or more coils and the one or more permanent magnets, wherein nothing is in the space.

7. The device of claim 1, wherein:
 the rotor shaft has a longitudinal axis and an outer surface,
 the casing has an inner surface facing the outer surface and the longitudinal axis,
 the one or more permanent magnets are attached to the outer surface of the rotor shaft,
 the one or more coils are attached to the inner surface of the casing, and
 the gas turbine engine running in the combustion mode turns the rotor shaft about the longitudinal axis.

8. An aircraft comprising a power generation device, comprising:
 a gas turbine engine including a rotor shaft and a first casing around the rotor shaft; wherein:
  the rotor shaft has a first longitudinal axis and a first outer surface,
  the first casing has a first inner surface facing the first outer surface and the first longitudinal axis;
 a transmission connecting the rotor shaft to a gearbox, the transmission comprising a drive shaft and a second casing around the drive shaft; wherein:
  the drive shaft has a second longitudinal axis and a second outer surface,
  the second casing has a second inner surface facing the second outer surface and the second longitudinal axis;
 a plurality of permanent magnets disposed in one or more magnet pairs each including a first magnet and a second magnet;
 a plurality of coils disposed in one or more coil pairs each including a first coil and a second coil, wherein:
  the first magnet and the second magnet are attached at diametrically opposite positions on at least one of the first outer surface or the second outer surface,
  the first coil and the second coil are attached at diametrically opposite positions on at least one of the first inner surface or the second inner surface, and
  the first magnet has a north polarity facing the first inner surface or the second inner surface and the second magnet has a south polarity facing the first inner surface or the second inner surface; and
 an aircraft electrical system connected to the coils when the power generation device is operating as a generator, wherein:
  the aircraft electrical system receives electrical power generated using the plurality of coils when:
   the gas turbine engine is running in a combustion mode so as to turn the permanent magnets on at least one of the rotor shaft or the drive shaft, and
   first magnetic fields generated by the plurality of permanent magnets interact with the plurality of coils.

9. The power generating device of claim 8, further comprising:
 a circuit comprising the aircraft electrical system, a driving circuit, and a switch configured so that the driving circuit is connected to the coils when the power generation device is operating as a motor and the aircraft electrical system is connected to the coils when the power generation device is operating as the generator;
 the driving circuit connected or comprising a power supply and providing a current to the coils so that a second magnetic field of the first coil has an opposite polarity to a third magnetic field of the second coil, the second magnetic field and the third magnetic field interacting with the permanent magnets to drive the rotor shaft when the gas turbine engine is cooling down; and a computer connected to the driving circuit, the computer and the driving circuit energizing the coils so that the permanent magnets and the coils operate in a direct current (DC) brushless motor configuration.

10. The power generation device of claim 9, further comprising the computer controlling the current from the power supply such that:

the electrical power is provided to the coils so as to drive the rotor shaft after engine shut down, and an interaction of the second magnetic field and the third magnetic field with the permanent magnets rotates the rotor shaft at one or more speeds.

11. The power generation device of claim 10, wherein the speeds are between 0.5-2.0 rpm (revolutions per minute).

12. The device of claim 10, wherein a rotation of the rotor shaft includes pulsed rotation.

13. The device of claim 10, wherein a rotation of the rotor shaft includes clocked rotation and/or sporadic rotation.

14. The power generating device of claim 8, further comprising a computer connected to the gas turbine engine, wherein:

the permanent magnets include the first magnet and the second magnet attached to the rotor shaft and the first coil and the second coil attached to the first inner surface, the electrical power generated by the coils powers the electrical system during times of peak electrical loading of the electrical system, and the computer reduces fuel consumption in the gas turbine engine as compared to when the gas turbine engine is used to power the electrical system during the times of peak electrical loading without the electrical power from the coils.

15. A power generation device, comprising:

a gas turbine engine including a rotor shaft and a first casing around the rotor shaft;

a transmission connecting the rotor shaft to a gearbox, the transmission comprising a drive shaft and a second casing around the drive shaft; and a brushless direct current (DC) generator, wherein the brushless DC generator comprises:

a plurality of permanent magnets, wherein:
the plurality of permanent magnets are attached to at least one of the rotor shaft or the drive shaft;

a plurality of coils, wherein:
the plurality of coils are attached to at least one of the first casing or the second casing; and an aircraft electrical system connected to the coils, wherein:

the aircraft electrical system receives electrical power comprising a direct current generated by the brushless DC generator when:

the gas turbine engine is running so as to turn the permanent magnets on at least one of the rotor shaft or the drive shaft, and magnetic fields generated by the permanent magnets interact with the coils.

16. The power generation device of claim 15, wherein the brushless DC generator is integrated with the gas turbine engine and further comprising a computer controlling a timing sequence for energizing the coils.

17. The power generation device of claim 15 wherein the aircraft electrical system includes an energy storage device storing the electrical power.

18. The power generation device of claim 17 wherein the energy storage device comprises a battery.

* * * * *

UNITED STATES PATENT AND TRADEMARK OFFICE
CERTIFICATE OF CORRECTION

PATENT NO. : 11,022,004 B2
APPLICATION NO. : 15/475935
DATED : June 1, 2021
INVENTOR(S) : Jeffrey Lynn Duce, Kent E. Karnofski and Stephen D. Oehler It is certified that error appears in the above-identified patent and that said Letters Patent is hereby corrected as shown below:

In the Claims

Column 11, Line 45, please insert --when-- after "turns"

Column 11, Line 49, please delete the ";"

Column 11, Line 50, please delete "and"

Signed and Sealed this
Twenty-sixth Day of December, 2023

Katherine Kelly Vidal
*Director of the United States Patent and Trademark Office*